Oct. 19, 1965  A. C. PALATINUS  3,213,381
METHOD AND APPARATUS FOR THE MEASUREMENT OF AMPLIFIER LINEARITY
Filed Feb. 4, 1963  8 Sheets-Sheet 1

Fig. 1a

INVENTOR.
ANTHONY C. PALATINUS
BY Ernest J Weinberg
ATTORNEY

Oct. 19, 1965 A. C. PALATINUS 3,213,381
METHOD AND APPARATUS FOR THE MEASUREMENT OF AMPLIFIER LINEARITY
Filed Feb. 4, 1963 8 Sheets-Sheet 5

INVENTOR.
ANTHONY C. PALATINUS
BY Ernest J. Weinberger
Max A. Farmer
ATTORNEYS

FIG.6.

United States Patent Office 3,213,381
Patented Oct. 19, 1965

3,213,381
METHOD AND APPARATUS FOR THE MEASUREMENT OF AMPLIFIER LINEARITY
Anthony C. Palatinus, 68—17 60th Road, Maspeth, N.Y.
Filed Feb. 4, 1963, Ser. No. 256,179
10 Claims. (Cl. 330—2)
(Granted under Title 35, U.S. Code (1952), sec. 266)

The invention described herein may be manufactured and used by or for the Government of the United States of America for governmental purposes without the payment of any royalties thereon or therefor.

The present invention relates to apparatus and a method for the measurement and display of distortion characteristics and in particular to determining the distortion introduced by an active electrical element, such as an amplifier, over a selected frequency band. This application is a continuation-in-part of my copending application, Serial No. 120,096, filed on June 27, 1961, now abandoned.

Presently available equipment and methods of determining the inherent distortion or non-linearity of amplifiers and in particular those amplifiers that operate over a relatively narrow frequency band is both the lack of an extremely stable test signal source and the lack of sensitivity with an excessive expenditure of time. The desirability and necessity of such measurements have of recent date become quite apparent in view of the extensive present and projected use of highly selective, sensitive, and specialized equipment. Further, it should be noted that the accuracy of such determination characterizes the equipment and prevents or detects possible spurious signals in transmitters, and in systems where facsimile, picture, and other types of high speed data transmission is experienced.

In view of the foregoing, it is an object of this invention to provide a system which is capable accurately of measuring the distortion introduced by an active circuit element, such as an amplifier, over a selected frequency range.

Another object of this invention is to provide a relatively simple, accurate, practical efficient and inexpensive method and apparatus for measuring distortion.

Other objects and advantages will appear from the following description of an example of the invention, and the novel features will be particularly pointed out in the appended claims.

Figure 1A:
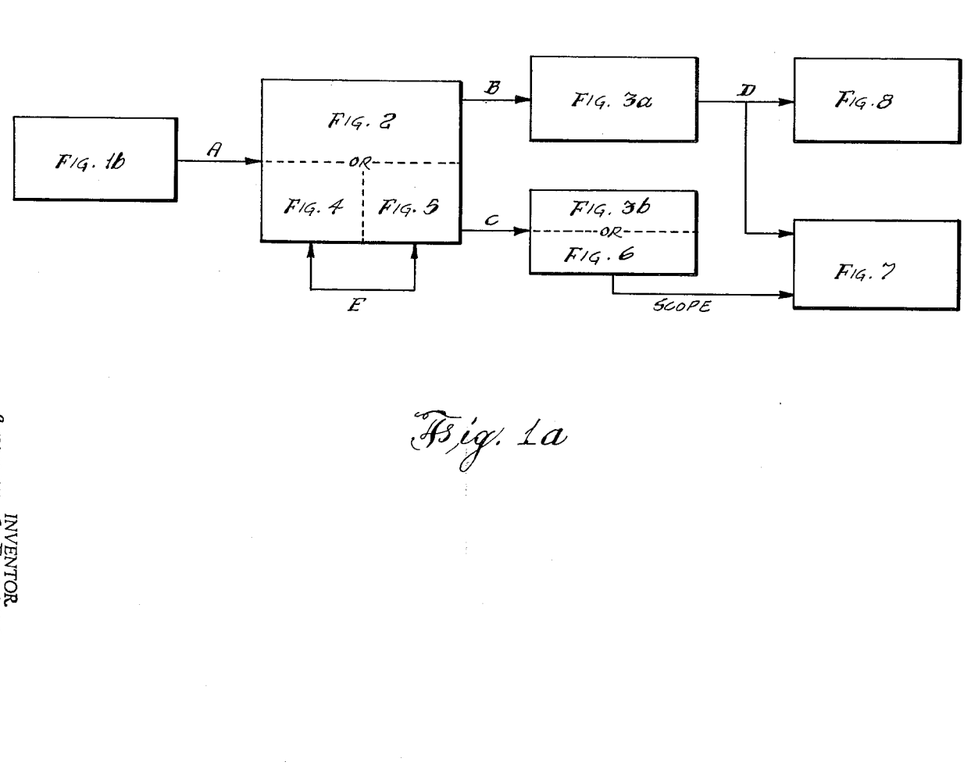
FIG. 1a is a diagrammatic representation of the interrelation of the various drawings enumerated below.
Figure 1B:
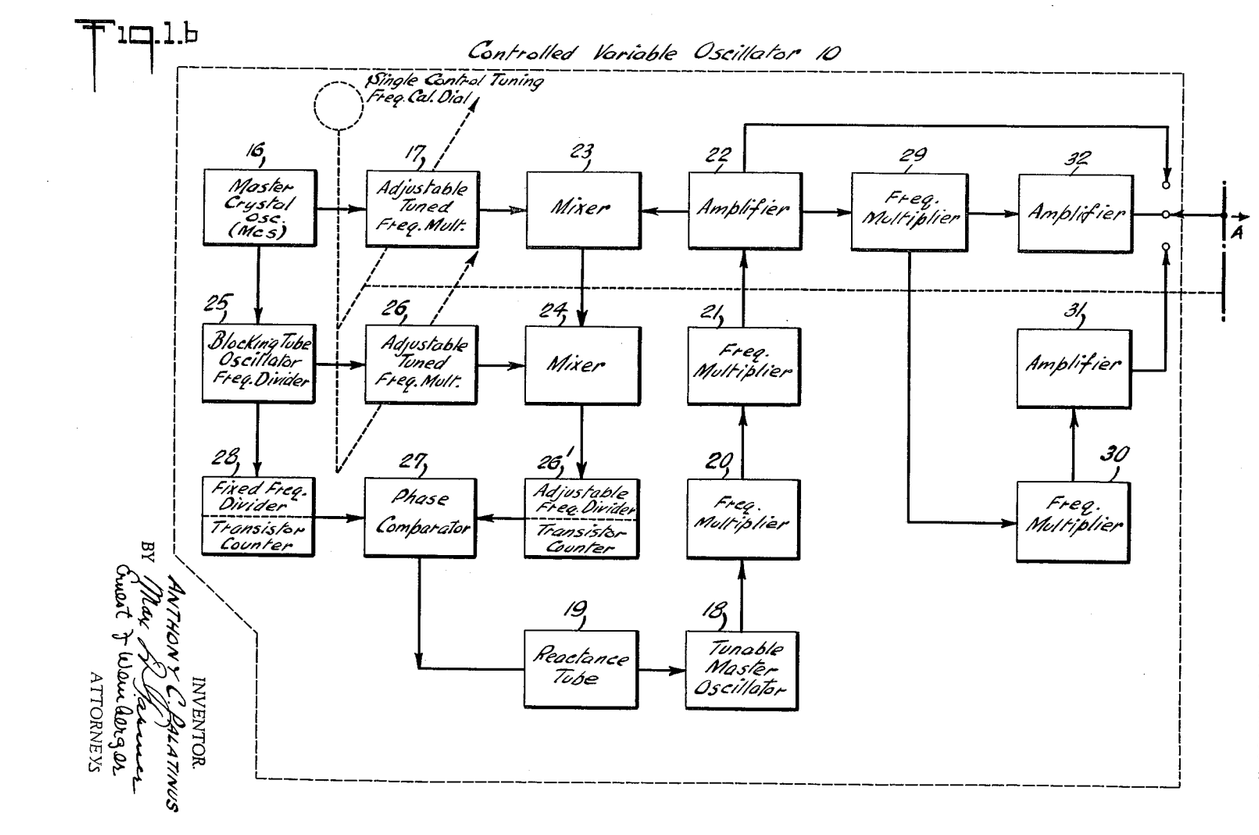
FIG. 1b is a block diagram of a variable stable source of high frequency energy.
Figure 2:
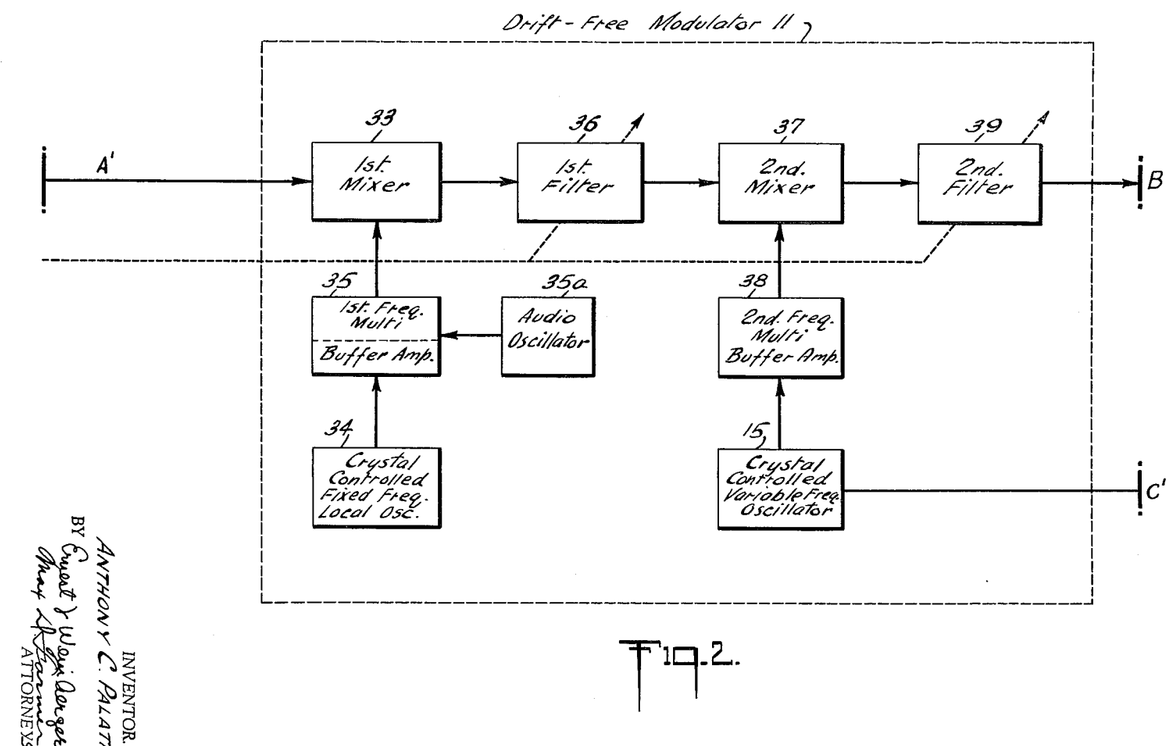
FIG. 2 is a block diagram of an amplitude modulated swept frequently modulator.

In the portion of the embodiment of the invention illustrated in FIG. 1b, a stable center frequency is generated by the frequency controlled variable oscillator 10 which may be any suitable stable oscillator such as that associated with a crystal frequency synthesizer and then applied to the modulator stage 11 (FIG. 2). The output of the modulator is fed through appropriate output stages 12 (FIG. 3a) and the resultant output is a stable amplitude modulated swept center frequency. For purposes of illustration and operability, the sweep modulation voltage is of the sawtooth type and is generated in stage 13 employed to vary the frequency of the variable oscillator 15 of the modulator 11. This in effect varies the deviation of the center frequency in a linear manner with time although other types of modulation might be obtained, as, for example, sinusoidal modulation. If one wishes to visually display the output on an oscilloscope, then the sweep modulated signal is applied through the item being evaluated to the vertical deflection system while the sawtooth output is applied to the horizontal deflection plates.

The frequency controlled variable oscillator 10 is shown in block diagram form for the sake of simplicity since commercial equivalents are presently available and may be readily purchased. In essence, the function of the controlled oscillator is to generate a stable variable center frequency and the heart of such a device is a master crystal oscillator 16 which is temperature compensated as for example, one controlled by an oven and serves as a standard. The frequency of the controlled oscillator or frequency synthesizer output is being continuously monitored against the master oscillator by the frequency selecting components and making adjustments to insure the exact frequency of the output. The master oscillator 16 provides two outputs, one of which feeds an adjustable tuned frequency multiplier 17. In order to explain the operation and merely for illustrative purposes, it is assumed the master oscillator frequency is 1 mc. and the multiplier is continuously capable of multiplication over a selected range, as for example, 2 times. This might be in the form of harmonic multiplication or some other integer form of multiplication. At the same time, a tunable master oscillator 18 whose frequency of oscillation is controlled by a voltage sensitive device such as a reactance tube circuit 19 generates a particular frequency which is multiplied by the multipliers 20 and 21 and applied to amplifier 22. As an example, let us assume the frequency after successive multiplications is 3 mc. and one output of amplifier 22 feeds the mixer 23 where this signal is mixed with the multiplied master oscillator output of 2 mc. to produce a mixer output after filtering of 1 mc. The 1 mc. signal is now applied to a second mixer 24 which mixes this signal and one which was generated at the other master oscillator output, reduced by the blocking oscillator (frequency divider) 25 to 100 kc. then multiplied up to 1.2 mc. by another tuned adjustable frequency multiplier 26 which is operable in conjunction with tuned multiplier 17 as by a ganged tuning shaft or control. This coupled type of tuning, for example, restricts the output of mixer 24 to within the 100 kc. to 200 kc. spectrum which is known as the residual frequency. This residual frequency is further reduced by adjustable frequency divider 26' to 100 cycles and fed to one input of phase comparator 27 and there compared with the 100 cycle output of a fixed frequency divider 28 which receives the other output of the master oscillator 16 through blocking oscillator 25. The comparator output is proportional or dependent on the input frequencies and its output signal controls the action of reactance tube 19 which in turn controls the frequency generated by the tunable master oscillator 18 so that its frequency is compared to the reference frequency of the master oscillator 16 by way of a loop circuit just described. Various signal frequency values can be generated by the controlled variable oscillator as by successive multiplication of the frequency generated by the tunable master oscillator 18. This multiplication takes place in multipliers 29 and 30 in addition to those previously mentioned. Tuned amplifiers are also included in the higher frequency outputs in order to insure sufficient output and purity of the signal frequency.

A more detailed description of the controlled variable oscillator would serve no purpose in view of the fact that each of the circuits represented by the blocks are well known and the fact that frequency synthesizers are standard laboratory equipment. Suffice it to say that a synthesizer as described will cover several frequency ranges which may be chosen by design, and each made up of a great number of single frequency channels or discrete signals separated from each other by a fixed number cycles (1000) and each frequency in effect correlated to that of the master crystal oscillator. Present techniques allow nearly infinite frequency channel control with local operation of a direct reading frequency indication readout dial. Thus the generation of a selectable spectrum of closely spaced frequencies, the stability and accuracy of which are controlled by crystal controlled master oscillator, insures the availability of a highly stabilized selectable frequency over a wide range which constitutes the center frequency value of the final sweep frequency output.

The output or center frequency which will hereinafter be designated as $f_1$ of the variable oscillator 10 is fed into one input of the mixer stage 33 (see FIG. 2) and therein mixed with another signal frequency which originated in a crystal controlled fixed frequency local oscillator 34 and underwent multiplication in multiplier-buffer amplifier 35 and had been modulated therein by an audio signal from oscillator 35a to produce an output at the mixer including the sum and the difference sidebands and the center frequency including the amplitude modulation. Where the selected center frequency range is relatively low in frequency to the frequency generated by the local oscillators at the mixer, the multipliers 35 and 38 may be eliminated for the proper mixing relation, but a modulator must be employed to introduce the amplitude modulation.

The audio oscillator 35a is of any conventional type and generates, for example, a sine wave signal of an audio frequency, say 1000 cycles per second. An audio frequency amplifier may be used between the oscillator 35a and tuned amplifier 35; amplifier 35 is operated or driven beyond its normal operating point. That is, it is overdriven so that it multiplies by having its output tuned to the multiple harmonics, and not only does it multiply, but also acts to amplitude modulate the multiplied frequency, which is in the megacycle range by variation of the screen grid voltage of the tube in a sinusoidal audio frequency (1 kc.) manner. Now this mixer output is passed through filter 36 where the center and difference frequency are filtered out, while for example, the sum frequency sideband including the amplitude modulation is permitted to pass through and fed into the input of a second mixer 37. The variable frequency oscillator 15 is crystal controlled and generates a quiescent, or rest frequency identical to that of the local oscillator 34 and in order to attain the same stability it has an equally stable crystal unit. This oscillator 15 acts in much the same manner as a modulator in that its frequency deviation from the quiescent is directly dependent on the magnitude and polarity of the voltage input applied to its modulating element. Let us, therefore, assume for the moment that the input voltage is such that the frequency deviation so generated extends in equal amounts both below and above the quiescent frequency and denote this as $\pm \Delta f d_1$. This swept signal frequency is passed through multiplier 38, except for case as explained above, and then into mixer 37 whose output is filtered to give only the difference frequency sideband by filter 39. It is obvious that since first a sum frequency was mixed with a frequency identical to one of the sum components although swept, then with the difference frequency thereof retained that the resultant output is a swept form of the original center frequency $f_1$ including the amplitude modulation. Although the first filter passed only the sum while the second only the difference this operation could be reversed with equally satisfactory results.

Considering now the frequencies present at various points in the drift-free modulator 11, we have the input to the first mixer 33 constisting of $f_1$ at one point of $f_0$ multiplied $n$ times in the multiplier 35 ($nf_0$) and ampli- tude modulated by an audio sine wave. The resultant output of the first mixer 33 being $f_1$, and ($f_1 \pm nf_0$) with modulation and after the first filter 36 we have only ($f_1 + nf_0 + AM$) which is one input to the second mixer 37. The variable frequency oscillator 15 generates a frequency modulated signal controlled by its signal voltage input which may be represented by the term $f_0(\pm) \Delta f_0$ where $f_0$ is the quiescent frequency and $\Delta f_0$ is the deviation of the frequency about $f_0$. After passing this swept frequency signal through multiplier 38 also multiplied identical $n$ times the other input to the second mixer 37 is essentially $[nf_0(\pm)n\Delta f_d]$ where it is mixed and results in an output of $$[f_1 + nf_0 + AM], [f_1 + nf_0 + AM] \pm [nf_0(\pm)n\Delta f_d]$$

This output after being filtered in the second filter to remove all but the difference frequency is $$f_1 + nf_d - nf_0(\pm)n\Delta f_d + AM = f_1(\pm)n\Delta f_d + AM$$

It is evident therefore that in effect the modulation of the variable oscillator 15 has been transferred to the stable, accurate center frequency $f_1$ generated by the controlled oscillator 10. This swept frequency output has a practically driftless center frequency $f_1$ without the need of automatic frequency control via the usual feedback of frequency error or the use of additional complex correction circuitry.

To further illustrate the value of the double heterodyning process in the invention and disregarding for the moment the amplitude modulation, consider the practical existence of a minute equal amount of positive drift in the local oscillators 34 and 15 to be designated $+e$. Then with the signals applied to the first mixer 33 being frequencies $f_1$ and ($nf_0+ne$) with $nf_0$ being a greater value than $f_1$. Now, in this case, the first filter selects the difference frequency product, which is $[(nf_0+ne)-f_1]$, and becomes one input signal to the second mixer 37. The other input to mixer 37 is the multiplied sweep frequency modulated signal, $[nf_0 \pm n\Delta f_d]$, and likewise the added multiplied drift ($ne$). With the second filter set to select the difference frequency, the resultant output becomes $$[nf_0 \pm n\Delta f_d + ne] - [nf_0 + ne - f_1]$$
$$= nf_0 \pm n\Delta f_d + ne - nf_0 - ne + f_1 = f_1 \pm n\Delta f_d$$

In order to fully explain the operation and unique features of the drift-free modulator 11, the circuitry involved therein is shown in subsequent figures although other types of circuitry may be substituted for those hereinafter explained. Although a particular type of oscillator has been illustrated in the embodiment, it is well known that others may be substituted for that shown. Therefore, the invention disclosed by way of this specification is not to be construed as limited only to the illustrated embodiment.

Since both oscillators (34 and 15) would under certain conditions additively contribute to the drift within the modulator 11 and drift-free operation is required both oscillators are made to exhibit as nearly as possible identical operating characteristics. One desirable and suitable form of oscillator is the overtone crystal type. Under these conditions the two crystals operate in a fashion such that their temperature-frequency characteristics are similar and the frequency drift which may occur in each one will be in similar directions and very nearly of the same magnitude. Use is made of this factor in the double mixing since in one case the sum frequency is used and the difference frequency in the other whereby the drift occurring in the oscillators is canceled and the overall stability of the system is maintained. The overtone type of crystal operation generally employs the third or fifth overtone which constitutes a mechanical harmonic of the fundamental frequency of the crystal plate and is intended for series resonance with a low drive level. Ultimate system stability is achieved when the crystals are operated under controlled conditions, as for example, a crystal oven. Commercially available crystal units have a stability exceeding ±0.0005% (type CR-32/U) and are satisfactory for use in the illustrated embodiment where these crystals are operated, as described hereinafter, under proper drive levels and temperature conditions, with ageing and frequency drift due to excessive heat build-up minimized to well within acceptable limits.

Figure 4:
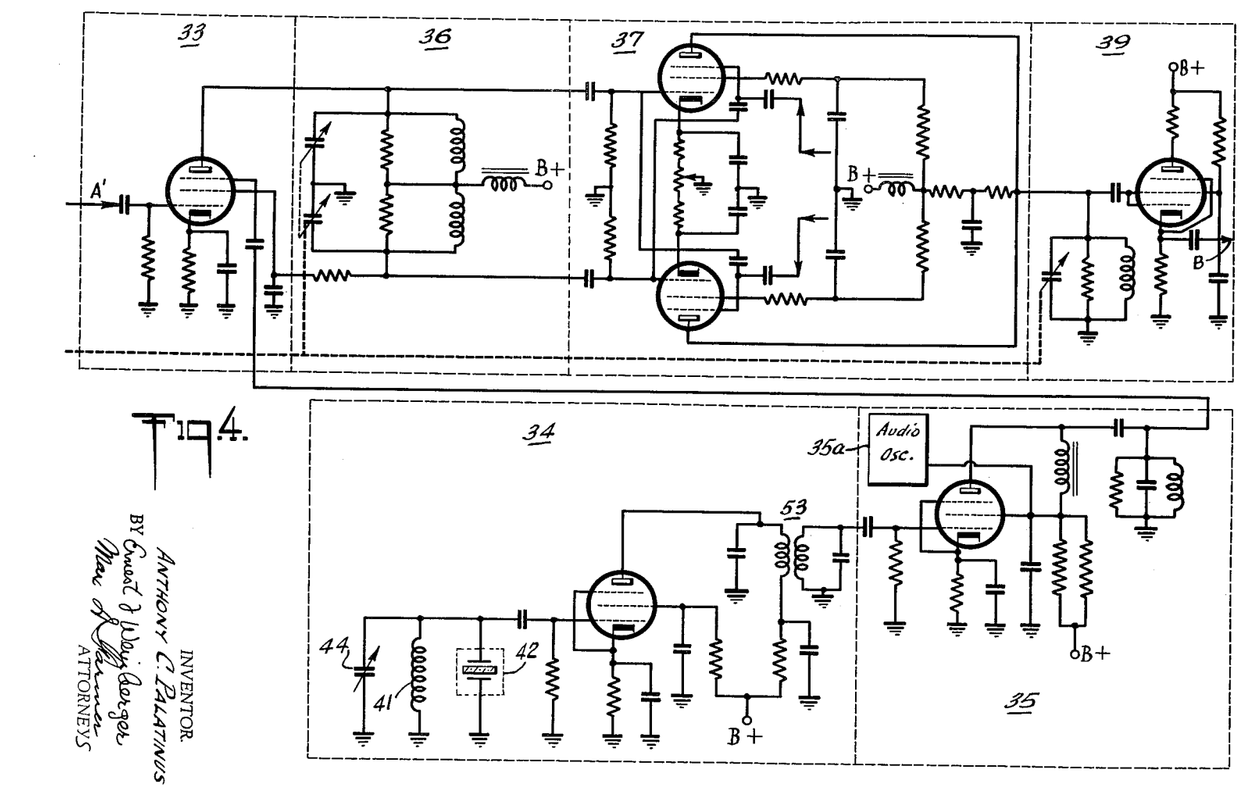
FIGS. 4, 5, and 6, are schematic diagrams of various blocks illustrated in FIGS. 1–3, and FIGS. 7 and 8 are block diagrams showing the terminal measuring stages.

Both the variable 15 and the local fixed oscillators shown are modifications of the "Lister Overtone Crystal Oscillator," which is completely described on pages 350-352 of "Electronics for Communications Engineers" published by McGraw-Hill, Inc., 1950. The oscillator makes use of the fact that a very high frequency overtone crystal unit having a low parallel resonant impedance can be operated as a high impedance circuit element when used in conjunction with an inductance to form an impedance inverting type network within the input grid circuit. The crystal oscillator utilizes the characteristic of the piezoelectric crystal to appear as a capacitive impedance when it is energized at some frequency below its normal series resonant frequency. Since its impedance is capacitively reactive, then, by shunting it with an inductively reactive impedance and applying the input to the grid of an electron tube, there is formed an anti-resonant parallel grid circuit having high impedance. By providing the crystal with shunting inductance of a sufficiently high magnitude the actual operating frequency of the overtone oscillator cannot occur at the series resonant frequency of the crystal. Observing now the oscillator circuits 15 and 34 of FIGS. 4 and 5, it is evident that the inductor 40 of the variable oscillator and inductor 41 of the fixed oscillator are in shunt with the crystal (42 and 43) units and also effectively in shunt with the sum of the crystal holder and wiring capacitance, Miller effect capacitance and the grid-cathode capacitance in addition to the trimmer capacitor 44 which tunes the fixed oscillator and the variable capacitive diode 45 in the case of the variable oscillator. The total combination is adjusted so that it is anti-resonant at the quiescent operating frequency of the crystal oscillator. With this circuit arrangement, as fully detailed in the aforementioned article, there is a linear relationship between either the shunt inductance or the variable capacitance and the frequency change of the overtone crystal oscillator. In the schematics shown, the inductance is maintained constant while the trimmer 44 or the diode 45 can be changed to vary the frequency of the oscillator output. It is obvious that a variable ferrite saturable reactor could be used in place of inductor 40 to vary the inductance instead of the capacitance, or a reactance tube could be used as the modulating element. The hysteresis effect, adverse tube effects, circuit damping and reactance simulation are eliminated by the proper use of a voltage sensitive variable capacitor (diode 45).

It is well known in the art that the application of a reverse voltage across a P-N junction produces a depletion layer at its boundary. The width of this depleted layer and hence the junction capacitance is a function of the potential difference across the junction and generally follows the relationship:

$$C = K(V + V_o)^{-n}$$

where C is the instantaneous junction capacitance in farads
V, applied potential difference in volts
$V_o$, internal constant potential (0.3 to 0.9 volt)
K, constant depending type of semiconductor
$n$ is usually ½ for an abrupt junction Although the absolute value of the capacity C at any given voltage is known to vary to some extent from diode to diode in commercially available silicon capacitor devices, the rate of variation of capacitance with voltage is known to be remarkably constant. Measurements of this factor $n$ has revealed that it not only remains constant or fixed but does not vary more than 1% from unit to unit and therefore considering all other factors these devices are capable of being used in sweep generation and modulation at rates from D.C. to 70 kc. In addition there are also commercially available P-N diode Varactors which have hyperabrupt or a reverse graded doping distribution whereby the factor $n$ is made equal to 1. This relationship (see preceding formula) with $n=1$ provides a linear relationship between the voltage and capacitance so that the tuning curve of the device or oscillator is linear.

Figure 5:
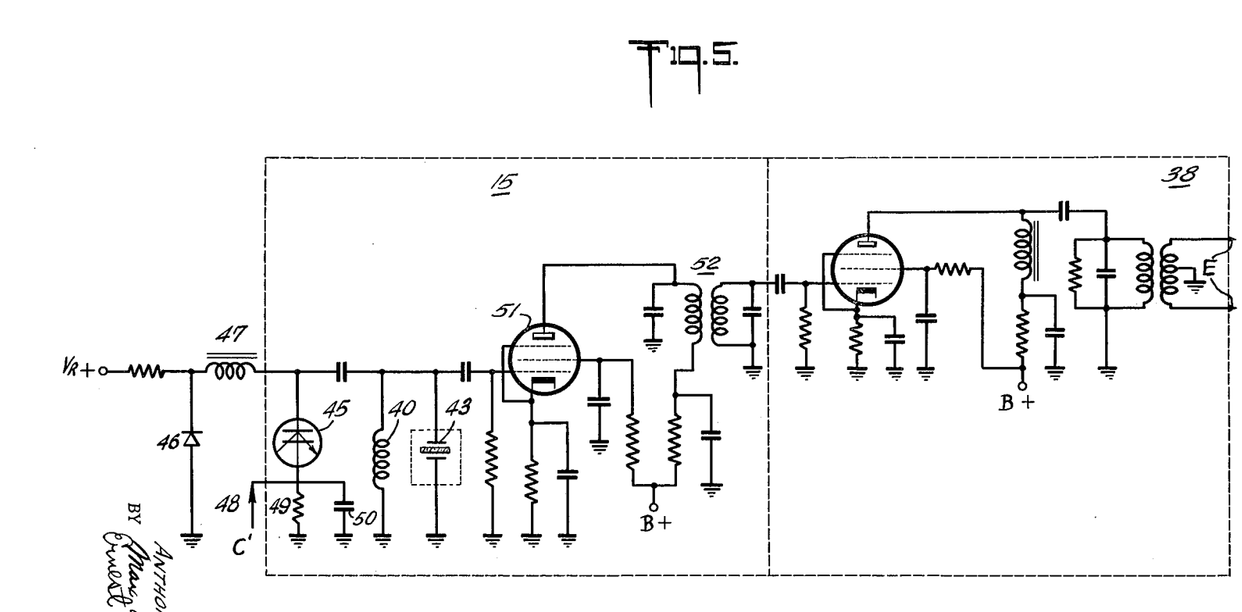

Referring now to the variable oscillator 15, shown in FIG. 5 voltage $V_r$ is supplied, as is conventional, by a standard regulated power supply and serves to properly bias the diode 45. In order to provide an accurate, stable bias voltage a zener diode 46 is placed across the line voltage $V_r$. This zener diode has a stability equivalent to that of a standard type cell and may be of any suitable type including 1N821 or 1N822 transitron diodes. Since the P-N diode 45 must be reversed biased either the N-side is positive biased or the P-side negatively biased. The R.F. choke 47 insures the high frequency isolation between the oscillator and the bias supply is effectively maintained. The modulating voltage is applied at 48 across the P-side resistor 49 and high frequency by-pass capacitor 50 of the diode 45 and from that point on the entire oscillator circuit including the crystal 43 and vacuum tube 51 and their associated circuitry operate as a modulated Lister overtone oscillator. The fixed oscillator 34 operates in a similar manner at a fixed frequency and their outputs are taken across transformers 52 and 53 and each is applied to the grid of a frequency multiplier-buffer amplifier, respectively 38 and 35. Further reference and explanation of the variable sweep oscillator and its operation will be given hereinafter in conjunction with the description of the frequency sweep and modulating generation system. The multipliers 35 and 38 are basically conventional circuits and similar to each other with the exception multiplier 35 has a single ended output while multiplier 38 has a balanced output. This is so since they feed mixer circuits one of which has a balanced mixer input and the other of which is single ended input. Each of the multipliers also acts as a buffer-amplifier in order to prevent interaction between its respective mixer and the oscillator. These frequency multipliers 35 and 38 employ tuned output amplifiers wherein the input signal to the amplifier overdrives the stages and produces harmonics in the amplifier plate output due to its operation over the nonlinear portion of the tube characteristics. The circuit output is tuned to pass a bandwidth including the desired harmonic frequency which may be any $n$ harmonic (e.g. 2nd, 3rd . . .) plus the multiplied sweep frequency deviation in the case of multiplier 38. In the case of multiplier 35 the added input thereto from the oscillator 35a provides an amplitude modulating signal. Since the tuned amplifier portion operates in its nonlinear region it also acts to amplitude modulate the output in accordance with the audio input being applied to the screen grid. The degree of multiplication or the selection of a particular harmonic depends on the frequency range of interest, amount of frequency sweep or deviation and the stability required. That is, once the frequency generated by controlled oscillator 10 is known, the mixing frequency (output of multiplier) can be determined and depending on the type of oscillator driving the mixer and its frequency range the degree of multiplication is selected. The selectivity characteristics of the multiplier's passband is designed such that all the unwanted harmonics and frequencies developed within the multiplier are greatly attenuated while the passband is maintained flat for the maximum frequency bandwidth generated by the modulation process to avoid attenuation of any significant sideband frequencies.

Of the mixers 33 and 37, 33 is a modified Aske gain doubling mixer with mixer 37 being of the double balanced type. Mixer 33 employs outer-grid injection mixing where the oscillations from the multiplier are applied to the suppressor grid 54 of the pentode mixer tube 55.

Interaction between the 1st filter 36 and the mixer 33 is avoided by placing a two terminal variable filter in the plate circuit of the pentode. This provides sufficient decoupling therebetween and the output becomes a time variation of the mixer transconductance as the plate current is approximately independent of the plate load (filter) due to the high plate resistance of the pentode tube. The mixer-filter combination is also referred to as a frequency converter and the output of this first converter (mixer 33 and filter 36) provides a balanced push-pull output for the double balanced mixer 37 which it feeds. This type of output provides for cancellation of the even harmonics existing in the stage, good isolation and sufficient conversion gain. The outer-grid mixing results in proper isolation for separate local oscillator excitation to avoid frequency pulling and allows for the single ended input from the controlled oscillator 10. The inherent frequency generation control of the mixing frequencies, permits the use of a tight tolerance filter and amplification stages thereby minimizing the conditions which encourage the generation of intermodulation type interference and enhances the overall frequency stability. First filter 36 maintains a flat bandpass wider than twice the audio modulating frequency of oscillator 35a.

The double balanced mixer 37 reduces distortion products to a minimum and avoids close-in spurious frequency effects. The second filter 39 is of a conventional design and the variable capacitors of each of the filters are coupled together to provide the proper tuning of each filter simultaneously although each could be independently manually tuned. Each is tuned to its own selected frequency whereby, for example, the first filter 36 passes the sum frequencies while the second filter 39 passes the difference frequencies.

Figure 3A:
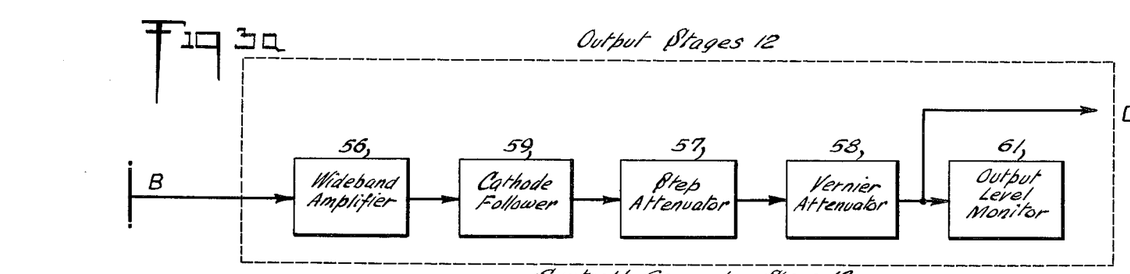
FIGS. 3a and 3b are block diagrams of the modulator output stages and a sawtooth generator.

The output of filter 39 which may be either a modulated center frequency, an AM, or a pure C.W. signal, is applied to a conventional series of output stages 12 (see FIG. 3). The wide band amplifier 56 and the other output stages are of common conventional design well known to those skilled in the art. The amplifier 56 permits the amplification of a wide band of frequencies so that the system is capable of power output over an extended range. In order to accurately control the output level independent of frequency, a step attenuator 57 and a vernier attenuator 58 for fine control are provided. The cathode follower stage 59 serves to match the amplifier 56 output impedance to the lower attenuator impedance and to properly isolate the stages from each other. For R.F. monitoring, the output level stage 61 is included as the last stage. The bandpass region of filter 39 is relatively flat and maintained uniform over a bandwidth that is at least twice the maximum sweep frequency deviation ($2 \times \Delta f$) to be developed.

It now remains to describe the modulation generation stages and their relation to the previously described circuits bearing in mind that the sweep or deviation in frequency of the sweep modulation must be accurately controlled. Referring now to the block diagram of FIG. 3b and in particular to the sawtooth generation stages, there is shown a bistable multivibrator 100 which may assume either of two stable conditions, as for example, no output, and a steady voltage output level dependent on the input thereto. Under one of these conditions the switch tube 101 is caused to assume a non-conducting state and a B+ voltage is applied to resistor-capacitor circuit 102 which has an extremely long time constant. The capacitor is charged only over a small portion of its time constant range so that the relationship with time is approximately linear (operates over an approximately linear portion). The voltage charge or build up across the capacitor of circuit 102 is passed through a series of cathode follower circuits 103 and 104 and then applied to a paraphase differential amplifier 105 whose output serves to change the state of the multivibrator 100 by way of cathode follower 106 and to initiate discharge of the capacitor to complete one cycle of the linear sawtooth. The linear sawtooth output may also be externally applied to associated equipment, as for example, the horizontal deflection plates or system of an oscilloscope (not shown) from the paraphase amplifier 105.

Figure 6:
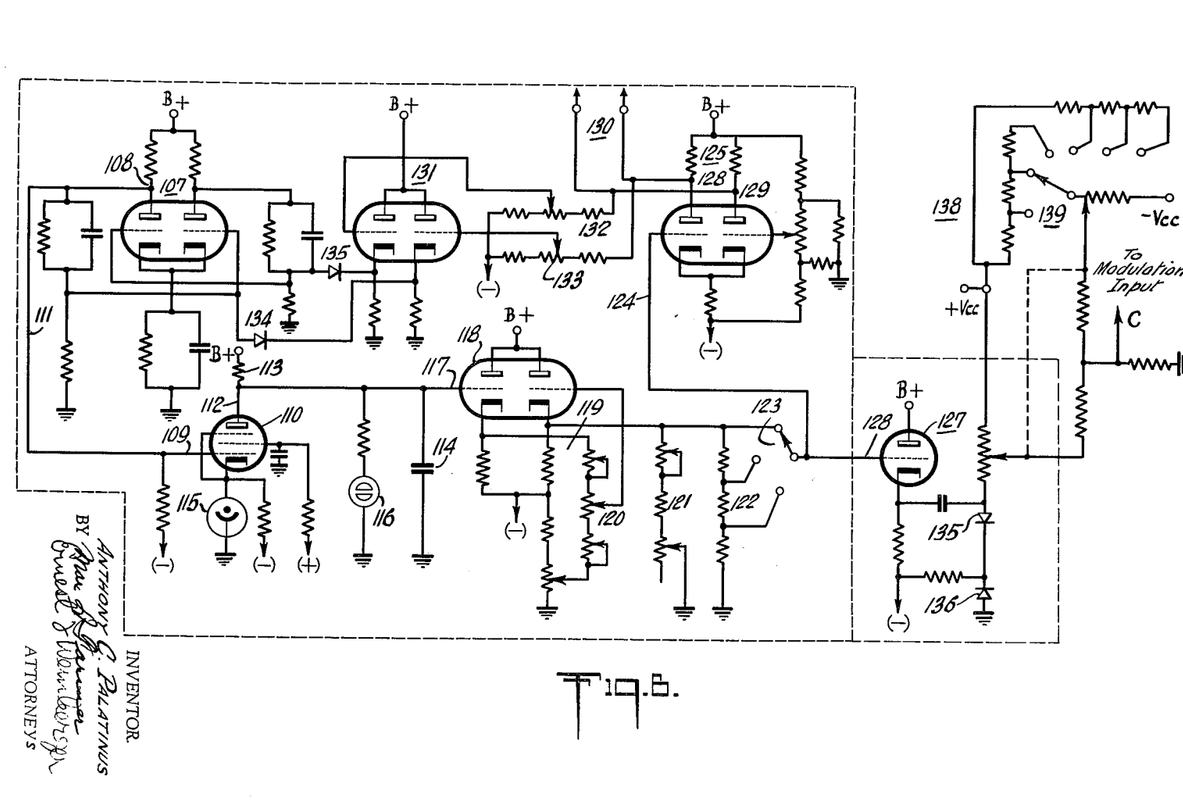

Bearing in mind that the following detailed description is for a narrow band linear sweep frequency (narrow band sweeping) since the modulation element (voltage sensitive capacitor) and the capacitor of circuit 102 are operated only over a small linear portion of their dynamic characteristics. The entire circuitry to be now described operates to generate a linear sawtooth voltage to be applied in part to the capacitance diode 45. Let us assume that the left side of the dual multivibrator tube 107 of FIG. 6 is suddenly made to conduct and therefore the voltage at the plate 108 decreases thereby resulting in a negative going output being applied to the grid 109 of the switch tube 110 by lead 111. This negative going voltage causes switch tube 110 to be cut off so that the plate voltage at 112 increases to B+ and is applied through resistor 113 to capacitor 114. The RC time constant of this R-C circuit is large due to the high resistance and capacitance values so that effectively the charging takes place over a linear portion of the capacitor (V-T curve) from some voltage value which appears on the plate 112 toward B+. This capacitor 114 is of high quality such as the nylar type. A voltage regulator tube 115 is provided in the cathode circuit of the switch tube 110 to set a reference cathode voltage and effectively set a constant ideal bias. The neon tube 116 which is across the switch tube output serves to indicate that the preceding circuitry is in operating condition.

The voltage appearing across the charging capacitor 114 or its output is fed into one grid 117 the dual cathode follower 118 and by way of the coupling between the output of one section of the dual cathode follower and the input of the other section the signal which constitutes the circuit output is taken across the cathode resistor circuit 119 of the second section. In order to electronically control the repitition rate and the sweep width of the sawtooth generated, at the follower 118 output potentiometer circuits 120 and 121 are provided and their operation is well known. This dual cathode follower 118 eliminates phase reversal and prevents any loading effects on the charging capacitor and provides the necessary low impedance output for the control potentiometers 120 and 121 thereby maintaining the sweep linearity. In addition, this follower provides a D.C. biasing voltage in the output in order to maintain a proper signal to ground condition. The dual cathode follower 118 is employed since each section thereof is used to control a separate parameter (repitition rate and sweep width) of the sawtooth and these sections were designated separately in the block diagram of FIG. 3b as 103 and 104. Since it may be desirable to select or set the output level of this stage, a divider network 122 is included with a selected switch 123 which allows for two identical outputs, one of which is coupled to the input grid 124 of a paraphase differential amplifier 125 and the other to the grid 126 of a cathode follower clamper 127.

The paraphase differential amplifier 125 operates in a standard manner to amplify the sawtooth input, and since the output is taken between or across the plates 128 and 129 of this dual circuit, it produces a balanced sawtooth output derived from the single-ended input. This effectively results in an output which is independent of the ground reference, that is, the voltage excursion of the sawtooth output voltage is symmetrical about some ground or reference potential. Output terminals 130 of the paraphase amplifier may serve to connect this output to the horizontal deflection circuitry of an oscilloscope (not shown) and a sawtooth applied thereto employed to provide a synchronized sweep. The amplifier output is also applied in a conventional manner to the grids of another dual follower 131 through precision potentiometers in divider networks 132 and 133. These networks limit and set the voltage excursion of the sawtooth by adjusting the drive voltage applied to the dual cathode follower 131 which is a decoupling circuit.

To facilitate a clear understanding of the generation and continuity of the sawtooth voltage the entire circuit involved will be considered. The left side portions of the dual tubes will be designated as "A" while the right half as "B." To start with, 107A was suddenly made to contact, thereby creating a negative going voltage applied to to 110 and cutting off this switch tube so as to slowly charge capacitor 114 over a small range. After passing through tube 118 this positive going sawtooth voltage across the capacitor is applied to the grid 124 of 125A causing the plate 128 to become less positive or negative going. This negative going voltage is finally applied to diode 134 which, under this condition, since it is coupled to the grid of 107B of the multivibrator and the plate of 107A causes 107B to start conducting and 107A to be cut off. Diode 135 acts and serves in much the same way. The tuning of this transition is controlled by the voltage level of this feedback signal which in turn depends on the setting of 132 and 133. The entire multivibrator circuit acts in a normal fashion in that opposite grid and plates are coupled and co-act such that the condition of one tube section directly affects the other. Since now section 107A is being cut off, a positive rising potential is applied to the switch tube 110 and the tube suddenly becomes conducting. This creates a low impedance path for the discharge of capacitor 114 due to the tube conduction and lowered plate potential. Since the impedance of the tube is low the time constant of the discharge path is short and the capacitor rapidly discharges in a nearly vertical fly-back manner. This negative pulse due to this discharge again passes through the circuit after amplification and causes 107A to conduct again, thereby creating another sawtooth cycle.

We have now a system for the generation of a stable cyclic recurrent linear sawtooth voltage which is partially in the form of a closed lop circuit with a balanced sawtooth output at the paraphase amplifier. The positive going sawtooth appearing at switch 123 is fed through the cathode follower clamper 127 which clamps the sawtooth base or low potential to absolute zero potential using back to back diodes 135 and 136. These diodes reference the clamper output to zero by returning one of the diodes to the potential derived from the forward conduction of the other diode. The output of this clamper is applied to the summing network 138. The summing network is purely resistive with no coupling capacitors and therefore a sawtooth waveform of low repetition rate may be employed. Although this network attenuates the signal somewhat, the signal voltage may be raised in the prior circuits to compensate for this loss and the fact that the preceding low impedance output cathode follower was used minimizes any coupling losses and provides good isolation. Since the input sawtooth was clamped to zero it possesses a D.C. component voltage which must be eliminated otherwise the voltage driving the diode 45 or voltage sensitive modulating element would create a sweep frequency centered about some frequency different from the intended quiescent frequency (zero voltage input). The desired sawtooth voltage starts at some negative value (−V) and passes through zero and then peaks at a positive voltage (+V) equal in absolute magnitude to the negative start voltage. In other words, the peak amplitudes of the sawtooth are equal and the zero point value is midway therebetween with respect to time. Selector switch 139 permits the selection of the proper bias or bucking voltage to be applied since for different settings of bandwidth and rate potentiometers determine the bucking voltage required. The summing network output is applied directly to the modulating element.

Particular details of an embodiment made in accordance with my invention have been described and the overall operation of the system will now be discussed. In the arrangement shown, the sweep modulating voltage, which may take any desired wave shape (e.g. linear sawtooth, squared sawtooth, sine wave, etc.) depending on the generating circuitry which, for illustrative purposes, is shown as generating a sawtooth type wave and which is applied to the voltage sensitive capacitor element and controlling the variable frequency oscillator 15. This wave shape (sawtooth) as described is of a form to produce an increasing frequency with time at oscillator 15. This is best illustrated by considering the following example. The frequency $f_1$ generated by the controlled variable oscillator 10 is selected such that it is lower than the quiescent unmodulated frequency of variable oscillator 15. Then the sweep deviation when modulated by a sawtooth starts from a frequency below $f_o$ and increases with time to a maximum frequency (at end of sweep) greater than $f_o$. If the center frequency $f_1$ is not selectable, then the quiescent frequency can be varied. In other words, the capacitance of the modulating element decreases with time as the sawtooth is applied and this in turn produces an increasing frequency which after the second filter (difference) 39 results in a center ($f_1$) swept frequency which is also increasing frequency-wise with time. The output of the paraphase amplifier 105 is such that it (voltage) is increasing positively with time in synchronization with the sweeping frequency output. This permits the application of the paraphase amplifier output to be applied to the horizontal deflection plates of an oscilloscope to provide a scan while the swept signal or its equivalent may be placed across the vertical plates so that a simple and direct one to one relationship is established. Under these conditions knowing the center frequency $f_1$ and bandwidth of the sweep, a correlation on the scope screen can easily and accurately be made so that where a particular event occurs on the screen it may be identified with a particular known frequency. If the output (sweep frequency) of the last stage 61 were applied to some device which is to be evaluated relative to its frequency response and after passing through this device this resultant signal detected and placed on the vertical plates and the paraphase amplifier output on the horizontal plates, then the response of the device may be instantly observed over the entire swept frequency spectrum on the oscilloscope. In this connection it should be observed that the swept frequency output is jitter-free and an extremely narrow band-sweep width obtainable. In fact, by disabling the modulating voltage a CW signal appears at the system output. Where the response characteristics of narrow band devices are considered, such as quartz crystals, a narrow band sweep is essential in order to permit observance of extremely close responses. That is where the responses or characteristics are close together with respect to frequency, the system of this invention due to its excellent frequency stability and accurately controllable sweep voltage allows for very slow sweep rates and narrow frequency bandwidth essential for good resolution.

Figure 3B:
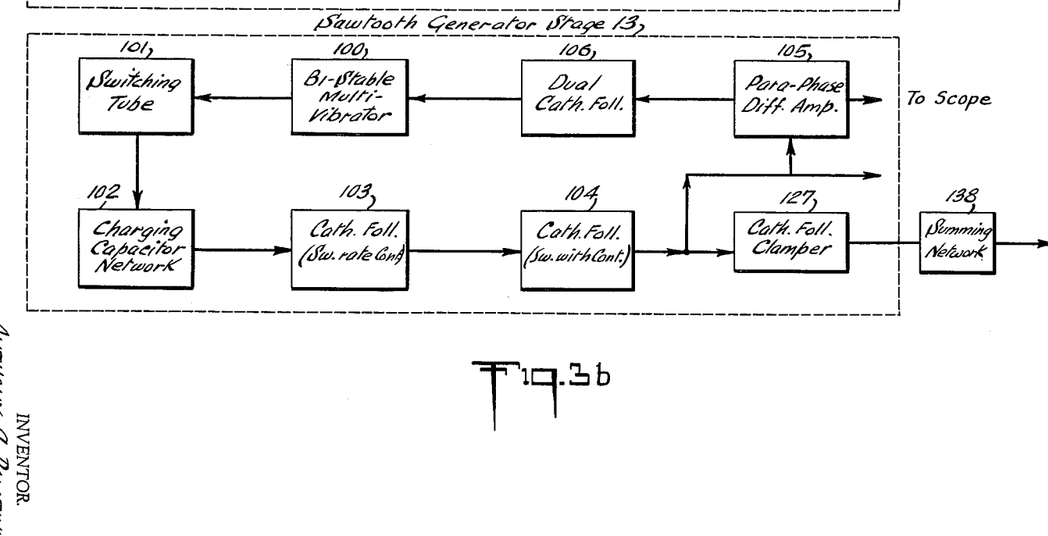

Although some of the blocks shown in FIGS. 1, 2 and 3, have been described and illustrated in detail, many variations can be made and commercial equivalents substituted therefor. One such might be the controlled variable oscillator 10 wherein a Model N 317 Crystal Synthesizer manufactured by the Manson Laboratories may be used. The combination of the fixed oscillator 34 and the variable oscillator 15 could be replaced by the Bulova Ultra-Stable shift oscillator. This shift oscillator assembly consists essentially of two crystal controlled overtone oscillators operating at identical frequencies and with equal stabilities, where one remains fixed while the other is varied by means of a "Varicap" the trade name of a semi-conductor type of voltage sensitive capacitor manufactured by Pacific Semi-Conductors, Inc. Another such device is manufactured by the Hermes Electronics Co. and designated as Model 10M–VX voltage controlled crystal oscillator.

Although no specific frequencies or ranges have been assigned or noted in the above, there exist today commercially available devices which may be employed in the illustrated embodiment and which allow coverage up to microwaves. The components used in FIGS. 4, 5, and 6 cover the range from 2–100 mc. and may be modified by conventional circuitry to extend this range into audio frequencies with extremely narrow sweep bandwidths.

Considering now that we have an output, from all the previously described circuitry, which is an amplitude modulated carrier frequency that is itself being frequency swept in a linear fashion, it is possible to employ this particular output to determine the distortion introduced by an active circuit element. Such an element might be a narrow band high frequency amplifier whose amplitude distortion must be determined over its operating range. The circuit arrangement illustrated in FIG. 7 constitutes the simplest circuit form for practicing the invention. The particular type of output described above emanates from the output stages 12 and is connected to the input of the amplifier 200 while its output is terminated in a proper load 201. Both the input and output terminals are connected to the contacts 202 and 203 of double throw single pole switch 204 while the moving contact or pole 205 is connected to the input of signal detector 206. The detector output is applied to the input of harmonic wave analyzer 207, which may be any of the common variety of analyzers readily available to cover the audio spectrum and above. The amplitude modulated swept frequency signal is amplified by the amplifier 200 and passed on to the load. With switch 204 positioned so as to apply the input signal directly to the detector 206, the signal is demodulated and the detector output consists essentially of the wave envelope which in this case is the audio modulation. When the detected signal acts upon the analyzer 207, the readout 208 should indicate that no harmonics of the fundamental audio modulation are present and that no distortion has been contributed by the source of the original swept signal. This step initially establishes the fact that any harmonics detected when the switch is positioned to apply a portion of the amplifier output to the detector were introduced by the amplifier under test and no other element. If the amplifier is distorting the signal then the analyzer will indicate the presence and amplitude of the various harmonics of the fundamental which are indicative of the degree of distortion. The term "distortion" noted herein refers to the inability of an element to either amplify or pass all the frequencies within its operating range (bandwidth) in their same relative portion to each other as they were constituted in the input thereto. In other words, for a distorting or nonlinear amplifier, not all the frequencies are amplified by the same factor or amount.

Figure 7:
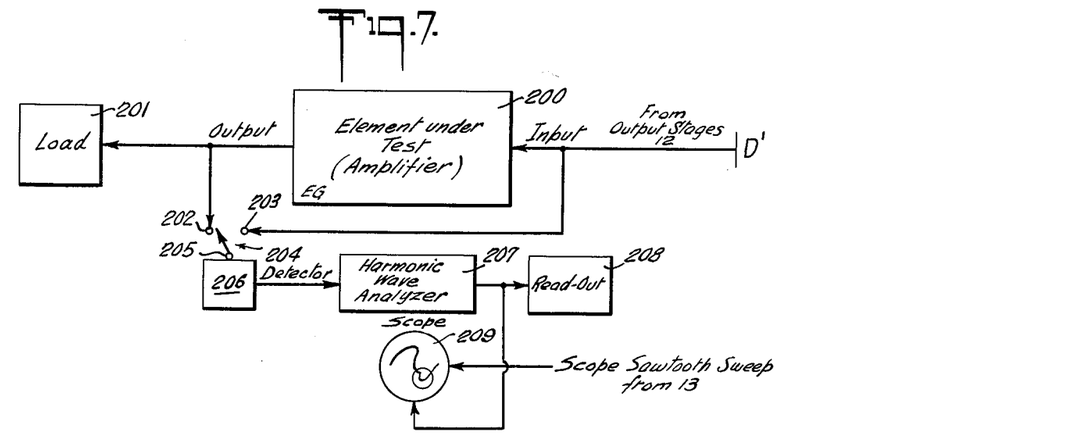

If it is desired to observe the distortion, it is merely necessary to place the vertical deflection section of an oscilloscope 209 across the detector output and to set the oscilloscope sweep to the same frequency or repetition rate as the amplitude modulation. The representation then will be as illustrated in FIG. 7.

It has long been recognized that the proper determination of the amplitude characteristics of a system requires the elimination of amplitude variations from the test signal source where a sweep frequency measurement technique is to be employed. Where a series of tests are to be made, at different levels of amplitude, it can be seen that where a constant amplitude level is not maintained, then for a portion of the sweep the particular device under test may be driven into saturation and deliver erroneous results at the output of the tested device. It is well known that the carrier frequency component of a normal amplitude modulated wave does not vary in amplitude and so long as the amplitude of the audio modulating voltage does not vary, the amplitude of the upper (sum) and lower (difference) sidebands about the carrier frequency component will remain constant and represent a symmetrical modulating wave. Subsequently, demodulation of the AM wave results in a constant amplitude audio wave. Hence, this invention herein described and as applied, operates on the principle that harmonic distortion (a form of amplitude distortion) results from an amplification effect that varies with the amplitude of the applied signal and consequently causes a distortion of the envelope of the amplitude modulated wave, which is not observed in FIGURE 7 with the connection as shown. The harmonic wave analyzer 207 and readout 208 are conventional and constitutes a tunable amplifier having adequate selectivity to distinguish between the detected fundamental signal and its harmonics and whose output is indicated by a suitable meter such as an average reading full wave rectifier type of VTVM. To obtain a plotting on the face of the cathode ray tube indicator 209 of the harmonic amplitude response with frequency location, the wave analyzer is tuned to the harmonic of interest and the resultant D.C. output of the rectifier, besides going to the readout device 208, is also applied to the vertical deflection stages of the CRT indicator 209, (the prior input from the detector output being disconnected). The harmonic amplitude response now produces the vertical deflection of the CRT beam. The plot with respect to the frequency location of the sweeping carrier frequency of the AM wave that is being swept in step (i.e., the carrier and sidebands maintain the same frequency spacing across the selected frequency dispersion) is established by having the sweep voltage output 130 of the sawtooth generator stage 13, that is producing the test signal source, also being applied to the horizontal plates of the CRT indicator to give a synchronized frequency axis on the screen. It now can be seen that on separate scans of the sweep cycle a comparative sequence of all the response curves, which may be plotted on the CRT screen to the same or related scales, can be obtained by first observing the plotted characteristic of the test signal source; and with all circuit parameters of the device under test unchanged, successively obtain the plotting of the fundamental and harmonics of the detected output by successively tuning the wave analyzer to the audio modulating frequency and its harmonics of interests.

Figure 8:
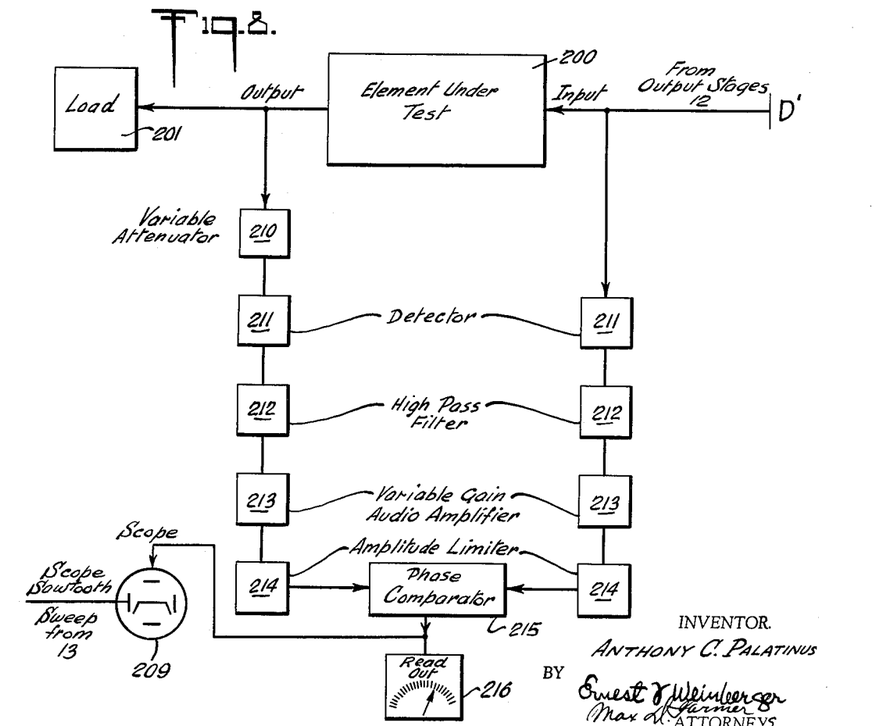

A more refined circuit arrangement is illustrated in FIG. 8 wherein the same form of input and load are employed except that a pair of electrical paths each having series connected, therein various elements are joined respectively across the amplifier input and output. The paths are identical except that in the output path there is included a variable wide-band attenuator 210. The envelope detector 211 in each path is similar to that mentioned in reference to FIG. 7. The high pass filter 212 cuts off all the frequencies below, say, 120 cycles, so that any 60-cycle hum present is eliminated before the demodulated signal reaches the measuring components. The signal is thereafter applied to a variable gain amplifier 213, then to an amplitude limiter or clipper 214. The outputs of both limiters are simultaneously applied to the phase comparator 215 where they are compared and the phase difference results observed on the read-out 216 meter, or a display of the phase difference over the frequency bandwidth and the AM signal is swept in frequency when the comparator output is applied to a vertical deflection amplifier and the vertical plates of a CRT whose horizontal deflection is governed by the sawtooth generator 13 of FIG. 3.

In order to apply approximately the same signal strength to both detectors, the variable attenuator 210 is employed in the output line since the signal strength therein is the greater of the two lines due to the amplification contributed by the amplifier under test. Where one is interested in measuring the power distortion, the envelope detectors may be of the square law type. Amplitude limiters or clippers are employed in order to insure that the signals concurrently applied to the phase comparator are of equal amplitude.

The function of the closed loop sawtooth generating stage 13 including the summing network stage 138 can be readily met by other closed loop time base generators. The dual channel limiters 214 and phase comparator 215 of FIG. 8 can be represented by commercially available phase meters such as the type 405H phase meter manufactured by Ad-Yu Electronics Lab., Passaic, New Jersey. It is to be noted that such phase comparison means utilize clipping or limiting to produce square waves having their zero-axis intersecting points remaining identical to those of the input signals and hence its accuracy is not affected by amplitude variation.

In general, it is recognized that non-linearity is produced from a transfer characteristic which is not a straight line. In a completely linear electrical system, the phase shift experienced by alternating-current waves of different frequencies, within a particular frequency band passed through the transmission path of the system, increases in accordance with increasing frequency. For phase linearity the resultant phase shift is directly proportional to frequency and thus delivers an equal amount of time delay to all signals, regardless of their frequency, as they pass through such a system. Actually, the phase shift characteristic of a practical system is always non-linear and phase distortion results. Hence, it is often required to plot the phase response curve with respect to frequency in some tedious, manually controlled, manner and to obtain a measure of the time delay variations that occur over a selected frequency band of interest, from the slope variation of the particular response curve that results. It is evident that a need exists for the automatic plotting of phase difference response with respect to frequency which can be visually displayed and repeated. It is of further advantage that measurements also be provided at single frequencies by direct meter readings, or through use of an external recorder as the indicating device. The invention herein described and as applied operates on the principle that phase distortion, a form of envelope delay distortion, causes the output waveform of a complex wave to differ from the waveform of the complex wave appearing at the input of the device being tested. Thus a phase comparison between related sideband components of the input and output complex waves results in an indication of the phase shift experienced by passage through the test transmission path. Hence, the envelope of the test AM wave will have its phase shifted by the difference in phase shift of the two sideband component frequencies, which is thereby detected in the dual identical demodulation process. Synchronization of the phase comparison output with the frequency location at which the resultant response occurs gives a visual plot. The resultant comparator output is a D.C. voltage proportional to the phase difference that results between the sideband components as they transverse over separate routes in the signal process.

Specifically, the amplitude modulated (AM) output signal from 35 that is being fed to mixer 33 is for unity magnitude of the form:

$$E \text{ AM out} = [1 + m \cos(\omega_a t + \alpha)]$$
$$[\cos(\omega_{co} t + \beta)]$$

Through trigonometric identities this becomes:

$$E \text{ AM out} = \cos(\omega_{co} t + \alpha)$$
$$+ \frac{m}{2} \cos[(\omega_{co} + \omega_a)t + \alpha + \beta]$$
$$+ \frac{m}{2} \cos[(\omega_{co} - \omega_a)t + \alpha - \beta]$$

with the energy spectrum now being at carrier frequency $f_{co}$ which is equivalent to $nf_o$, at an upper sideband frequency $(f_{co} + f_a)$ and at a lower sideband frequency of $(f_{co} - f_a)$; where $m$=depth of modulation and $f_a$=modulating audio frequency.

In the following heterodyning and sweep frequency operations, the absolute frequency values of the carrier and sidebands change but the frequency difference between the carrier and the sidebands remain fixed at the audio modulating frequency.

In particular, the AM wave being sweep frequency passed through the bandpass region experiences phase distortion in that each of the frequency components, (the upper and lower sideband and the carrier) undergoes a different delay time, and the sideband components as they recombine into the AM wave appearing at the bandpass output differs from the original form of the AM wave.

The method contemplated herein is relatively direct and independent of any particular apparatus described. Numerous methods and apparatus are available which will generate an amplitude modulated swept frequency signal while many forms of detection presently used are readily available. In this regard it should be noted that the sweep velocity is kept below that which would cause ringing in any of the circuits. Additionally, phase comparison as well as harmonic analysis will accomplish the final read-out or terminal step in the method. The read-out element may be calibrated to read directly in percentage distortion for either power or voltage. Essentially the practice of this inventive method requires only the following steps independent of the equipment employed to perform them:

(a) generating the amplitude modulated swept frequency signal,
(b) detecting (e.g. envelope) and
(c) detecting harmonics or phase comparison.

It should be observed that if it is desired to cover the entire bandpass of the amplifier under test then the frequency sweep of the source may be greater and in most cases, at least that of the amplifier. Generally speaking, where the amplifier is a narrow band power amplifier, then its bandwidth may be of the order of 6 kilocycles in which case the frequency sweep deviation should be at least 3 kilocycles either side of the center or quiescent frequency.

It can be seen that the range and accuracy of the circuits arrangement of FIG. 8 can be improved by the insertion of coherent range extenders in the dual channels before detection occurs. Essentially, a frequency convertor, located in each channel and having common local oscillator source, heterodynes the AM modulated carrier being swept in frequency to a predetermined IF frequency value for detection. Operation in this manner insures consistent performance of the detectors at a fixed region of their frequency response. The common local oscillator signal of course is derived from a stable tunable oscillator that is mechanically ganged to the tuning of the controlled variable oscillator 10, such that the difference frequency signal in the filtered output of the converters is the IF value.

The vertical axis of the CRT 209, that is, the ordinate scale, can be calibrated as envelope delay either in time or in degrees. The D.C. output of the phase comparator 215 is proportional to the phase angle difference between the two detection channels with the delay variation characteristcs of the two paths being matched.

The zero reference location on the CRT vertical scale is set by removing the sawtooth voltage source 48 from the modulating element 45 of oscillator 15 or reducing its sweep to zero volts. In this procedure, one eliminates the frequency modulation and a simple AM wave having its carrier frequency equal to the band center frequency of test item 200 is being applied directly to the detectors themselves, with the test item 200 being by-passed. For this condition the phase shift experienced is equal and the phase difference resulting is zero as represented on the calibrated screen. Thereafter, in normal operation, relative vertical deflections being traced out on the CRT represent variations of envelopes delay from that where no delay is experienced at a carrier frequency corresponding to the center frequency of the bandpass region of item 200.

Thus, the resulting response curve traces out a pattern whereby display points located below the response point located at the zero carrier deviation location (i.e., screen center) represents a decreased envelope delay, while portions of the response curve above this location represents increased envelope delay. The above procedure requires a fixed phase shift circuit in the input channel to compensate for variable attenuator 210 in the output channel. The phase shifter may be eliminated, the resultant phase difference output at zero sweep is referenced as zero time. Envelope time delay may be derived on the meter or screen scale and so calibrated based on the relationship that the time delay in seconds is equivalent to the ratio of phase shift of the amplitude modulated envelope in degrees and the frequency of audio modulation in c.p.s.; multiplied by a factor of 1/360.

The audio modulating frequency, $f_a$, here referenced at 1000 c.p.s., for illustration purposes, is in practical application held at a value that represents no more than a few percent of the narrow bandwidth of the device being tested. Such operation effectively provides for the determination of the slope of the phase-shift vs. frequency characteristic of the test item 200 at a point on the curve rather than over a sizeable portion of the bandwidth of 200. The practical system likewise maintains the amplitude of the AM wave being applied to 200 sufficiently low to allow the detectors to operate without saturation.

In a narrow band sweeping frequency test system of either of the cases stated above, it is necessary to pay close attention to the relationship between the changing frequency of test signal being applied and the detected response at the particular frequency locations with respect to the visual display of the results over the selected frequency band of interest. This is particularly true since injection of accurate calibration markers on a CRT display of a narrow band sweep is difficult and limited, as are other means, and methods of frequency axis calibration of the CRT screen. In this area, this invention makes full use of the drift-free principle of the frequency swept modulation of FIG. 2.

It can be seen that the system applications which give a response versus frequency location plotting of the device under test are capable of producing rapidly swept continuous visual displays on the CRT screen having conventional P7 phosphorous coating without objectionable flicker, and for highly selective stages sweep rates of 1 c.p.s. can be employed. The systems themselves are direct reading in that the tuning dial setting of the controlled variable oscillator 10 represents the frequency value at the center of the CRT screen display.

With the controlled variable oscillator 10 having its frequency output set to the center frequency value of the bandpass region of item 200 then the multiplied sweep frequency deviation ($+m\Delta fd$) of crystal control variable frequency oscillator 15 is set to vary the frequency output of oscillator 10 which at the output of the modulator source becomes the carrier frequency of the AM wave being applied to item 200. The total frequency deviation ($+m\Delta fd$) is set to cover the total (100%) bandwidth of the test item 200. Hence, the linear horizontal axis on the CRT screen 209 is calibrated to represent the carrier deviation as ±50 percent of bandwidth from the screen center which is designated the bandpass center.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:
1. A circuit arrangement for measuring the frequency distortion of an amplifier under test having an input and output, over a selected frequency spectrum which comprises:
   (a) a continuous source of selectable stable center frequency,
   (b) a second source of a second stable frequency different from said center frequency,
   (c) means to amplitude modulate said second stable frequency in response to a signal input thereto,
   (d) a source of a low sinusoidal frequency connected to said means to amplitude modulate for amplitude modulation of said second frequency,
   (e) a first mixer means having its inputs connected to said center frequency source and the output of said means to amplitude modulate said second frequency source for producing a resultant output having the sum and difference amplitude modulated sideband frequencies thereof,
   (f) means to filter said resultant output and to pass only the sum sideband frequencies,
   (g) a source of a stable recurrent cyclic voltage,
   (h) a source of stable variable frequency including means for directly varying its frequency in response to the amplitude of a voltage input about a quiescent frequency identical to that generated by said second source,
   (i) said cyclic voltage applied to said variable frequency source for varying the frequency,
   (j) a second mixer means having inputs for receiving said variable frequency and the sum sideband frequencies passed by said means to filter, for producing a mixed output thereof,
   (k) second filter means for passing only the difference sidebands of the input from said second mixer to said second filter,
   (l) said difference sideband output of said second filter applied to said amplifier input,
   (m) envelope detection means connected to the output of said amplifier,
   (n) means for detecting the presence of harmonics at the output of said envelope detection means,
   (o) whereby the amplitude and number of said harmonics is indicative of the distortion of said amplifier.

2. The arrangement according to claim 1, further including a third filter for passing only frequencies including said low sinusoidal frequency and greater, connected between said detection means and said means for detecting harmonics.

3. The arrangement according to claim 2, wherein said cyclic voltage is a linear sawtooth voltage.

4. A circuit arrangement for measuring the frequency distortion of an amplifier under test having an input and output, over a selected frequency spectrum which comprises:
   (a) a continuous source of selectable stable center frequency,
   (b) a second source of a second stable frequency different from said center frequency,
   (c) means to amplitude modulate said second stable frequency in response to a signal input thereto,
   (d) a source of a low sinusoidal frequency connected to said means to amplitude modulate for amplitude modulation of said second frequency,
   (e) a first mixer means having its inputs connected to said center frequency source and the output of said means to amplitude modulate said second frequency source for producing a resultant output having the sum and difference amplitude modulated sideband frequencies thereof, (f) means to filter said resultant output and to pass only the sum sideband frequencies, (g) a source of a stable recurrent cyclic voltage, (h) a source of stable variable frequency including means for directly varying its frequency in response to the amplitude of a voltage input about a quiescent frequency identical to that generated by said second source, (i) said cyclic voltage applied to said variable frequency source for varying its frequency, (j) a second mixer means having inputs for receiving said variable frequency and the sum sideband frequencies passed by said means to filter, for producing a mixed output thereof, (k) second filter means for passing only the difference sidebands of the input from said second mixer to said second filter, (l) said difference sideband output of said second filter applied to said amplifier input, (m) a pair of electrical paths, one path connected to the input and the other path to the output of said amplifier, (n) each of said paths having connected in series therein envelope detection means, (o) a high pass filter, (p) a linear variable gain amplifier, (q) a phase comparator, each of said paths terminating at the input of said comparator, whereby said phase comparator will indicate the distortion introduced by said amplifier.

5. The arrangement according to claim 4, wherein said detection means is an envelope detector.

6. The arrangement according to claim 5, further including an attenuator in said other path.

7. The arrangement according to claim 6, wherein said attenuator is disposed between said amplifier output and said square law detector.

8. The arrangement according to claim 7, further including in each of said paths after said linear variable gain amplifier amplitude limiting means.

9. The arrangement according to claim 8, wherein said cyclic voltage is a sawtooth voltage whose amplitude is sufficient to vary the frequency of said variable frequency about its quiescent frequency by a value at least twice the bandwidth of said amplifier under test.

10. A circuit arrangement for measuring the frequency distortion of a narrow band amplifier over its bandwidth which comprises:

(a) a continuous source of selectable stable center frequency, (b) a source of a second stable frequency different from said center frequency, (c) means to amplitude modulate said second stable frequency in response to a signal input thereto, (d) a source of a sinusoidal audio frequency connected to said means to amplitude modulate said second frequency, (e) a first mixer means having its inputs connected to said center frequency source and the output of said means to amplitude modulate said second frequency source for producing a resultant output having the sum and difference amplitude modulated sideband frequencies thereof, (f) means to filter said resultant output and to pass only the amplitude modulated sum sideband frequencies, (g) a source of stable, recurrent, cyclic time linear sawtooth voltage, (h) a source of stable variable frequency including means for directly varying its frequency in response to the amplitude of a voltage input, about a quiescent frequency identical to that generated by said second source, (i) said sawtooth voltage applied to said variable frequency source and of a magnitude to vary its frequency over a range in excess of twice the bandwidth of said narrow band amplifier, (j) a second mixer means having inputs for receiving said variable frequency and the sum sideband frequencies passed by said means to filter, (k) a second filter means connected to the input of said narrow band amplifier and having an output terminal for passing only the difference sidebands emanating from said second mixer, (l) a pair of parallel electrical paths each having in series therein, (m) an envelope detector, (n) a high pass filter, (o) a variable gain linear amplifier, (p) amplitude limiter means, one of said paths connected to the junction of the input of said narrow band amplifier and said output terminal of said second filter means, (q) the other of said paths connected to the output of said narrow band amplifier, (r) a phase comparator having a pair of inputs, (s) the free ends of said paths terminating at said comparator inputs, (t) whereby the indication of said comparator is indicative of the distortion of said narrow band amplifier.

References Cited by the Examiner

UNITED STATES PATENTS 2,958,729 11/60 Licklider _____________ 330—2 X
3,119,062 1/64 Codd _____________ 331—178 X ROY LAKE, *Primary Examiner.*

NATHAN KAUFMAN, *Examiner.*